United States Patent
Fromm

(10) Patent No.: US 9,208,090 B2
(45) Date of Patent: Dec. 8, 2015

(54) TRANSACTIONAL MEMORY PROXY

(71) Applicant: Silicon Graphics International Corp., Milpitas, CA (US)

(72) Inventor: Eric Fromm, Eau Claire, WI (US)

(73) Assignee: SILICON GRAPHICS INTERNATIONAL CORP., Milpitas, CA (US)

( * ) Notice: Subject to any disclaimer, the term of this patent is extended or adjusted under 35 U.S.C. 154(b) by 108 days.

(21) Appl. No.: 14/012,783

(22) Filed: Aug. 28, 2013

(65) Prior Publication Data

US 2014/0068201 A1   Mar. 6, 2014

Related U.S. Application Data

(60) Provisional application No. 61/696,047, filed on Aug. 31, 2012.

(51) Int. Cl.
| | |
|---|---|
| G06F 12/00 | (2006.01) |
| G06F 12/08 | (2006.01) |
| G06F 13/16 | (2006.01) |
| G06F 9/46 | (2006.01) |
| G06F 3/00 | (2006.01) |

(52) U.S. Cl.
CPC ............ *G06F 12/0828* (2013.01); *G06F 9/467* (2013.01); *G06F 12/084* (2013.01); *G06F 12/0813* (2013.01); *G06F 12/0831* (2013.01); *G06F 13/16* (2013.01)

(58) Field of Classification Search
CPC ................................... G06F 12/00; G06F 3/00
USPC .......................................... 711/141, 147–153
See application file for complete search history.

(56) References Cited

U.S. PATENT DOCUMENTS

| | | | |
|---|---|---|---|
| 5,255,387 A * | 10/1993 | Arnold et al. .................... 1/1 |
| 5,909,540 A * | 6/1999 | Carter et al. .................... 714/4.4 |
| 6,928,520 B2 * | 8/2005 | McAllister et al. ............ 711/141 |
| 8,209,499 B2 * | 6/2012 | Chou ............................ 711/150 |
| 2003/0149844 A1* | 8/2003 | Duncan et al. ................ 711/141 |
| 2005/0005073 A1* | 1/2005 | Pruvost et al. ................ 711/148 |
| 2008/0222389 A1* | 9/2008 | Bruce et al. .................... 712/28 |
| 2008/0256306 A1* | 10/2008 | Warner et al. ................. 711/152 |
| 2010/0017572 A1* | 1/2010 | Koka et al. .................... 711/159 |
| 2011/0161588 A1* | 6/2011 | Guthrie et al. ................ 711/122 |
| 2014/0325154 A1* | 10/2014 | Gray et al. .................... 711/122 |

* cited by examiner

*Primary Examiner* — Christopher Shin
(74) *Attorney, Agent, or Firm* — Lewis Roca Rothgerber LLP

(57) ABSTRACT

Processors in a compute node offload transactional memory accesses addressing shared memory to a transactional memory agent. The transactional memory agent typically resides near the processors in a particular compute node. The transactional memory agent acts as a proxy for those processors. A first benefit of the invention includes decoupling the processor from the direct effects of remote system failures. Other benefits of the invention includes freeing the processor from having to be aware of transactional memory semantics, and allowing the processor to address a memory space larger than the processor's native hardware addressing capabilities. The invention also enables computer system transactional capabilities to scale well beyond the transactional capabilities of those found computer systems today.

26 Claims, 12 Drawing Sheets

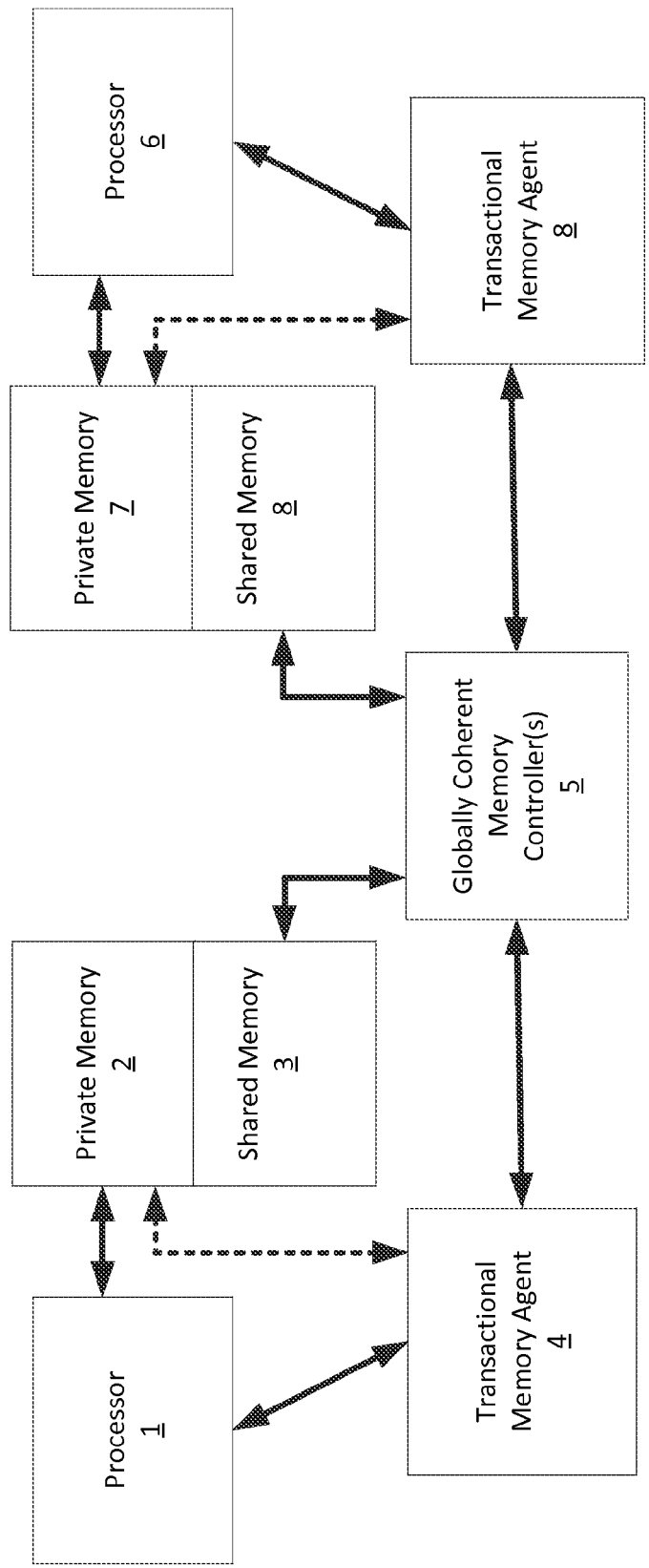
FIGURE: 1A

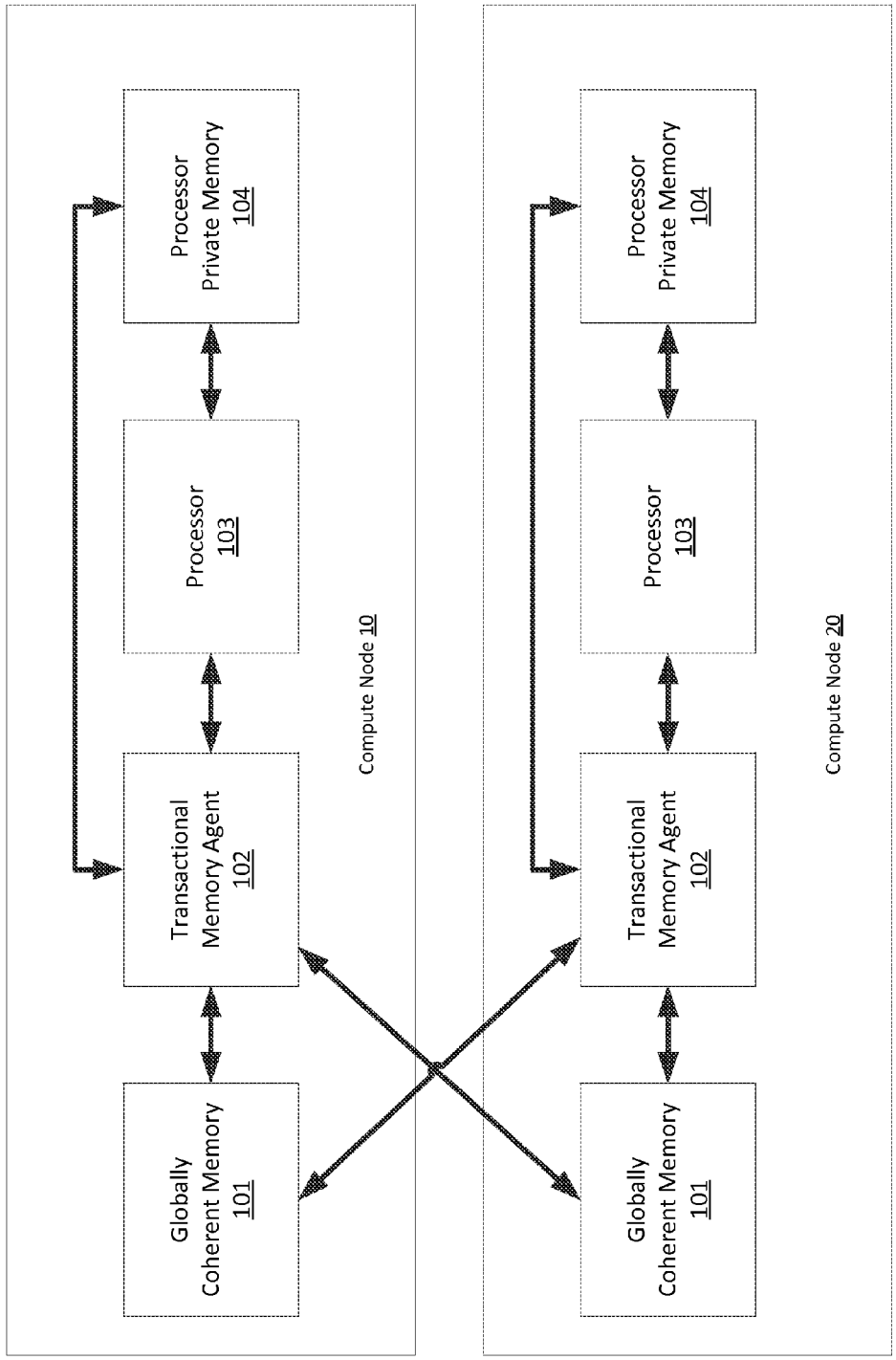
FIGURE: 1B

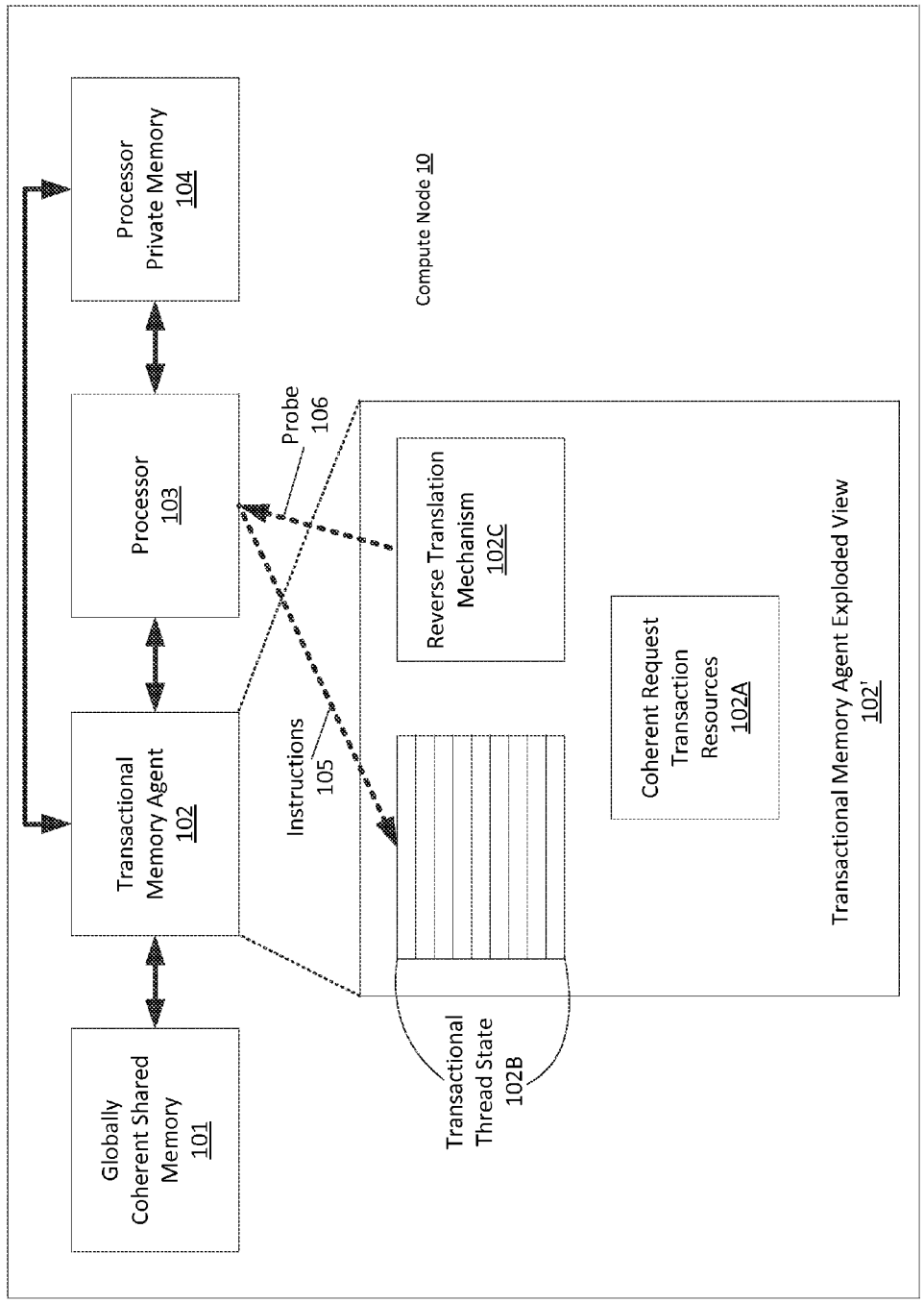
FIGURE: 1C

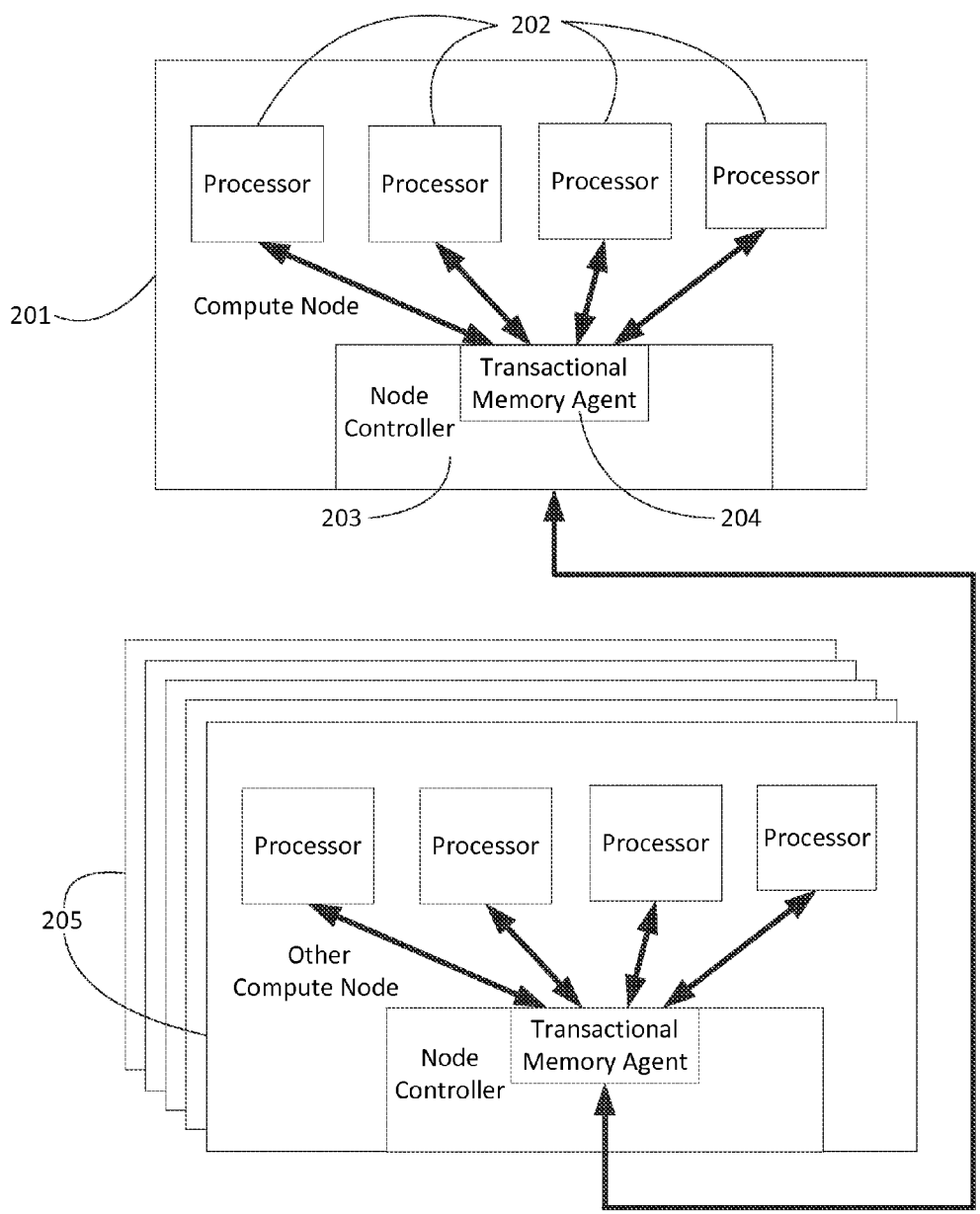
FIGURE: 2

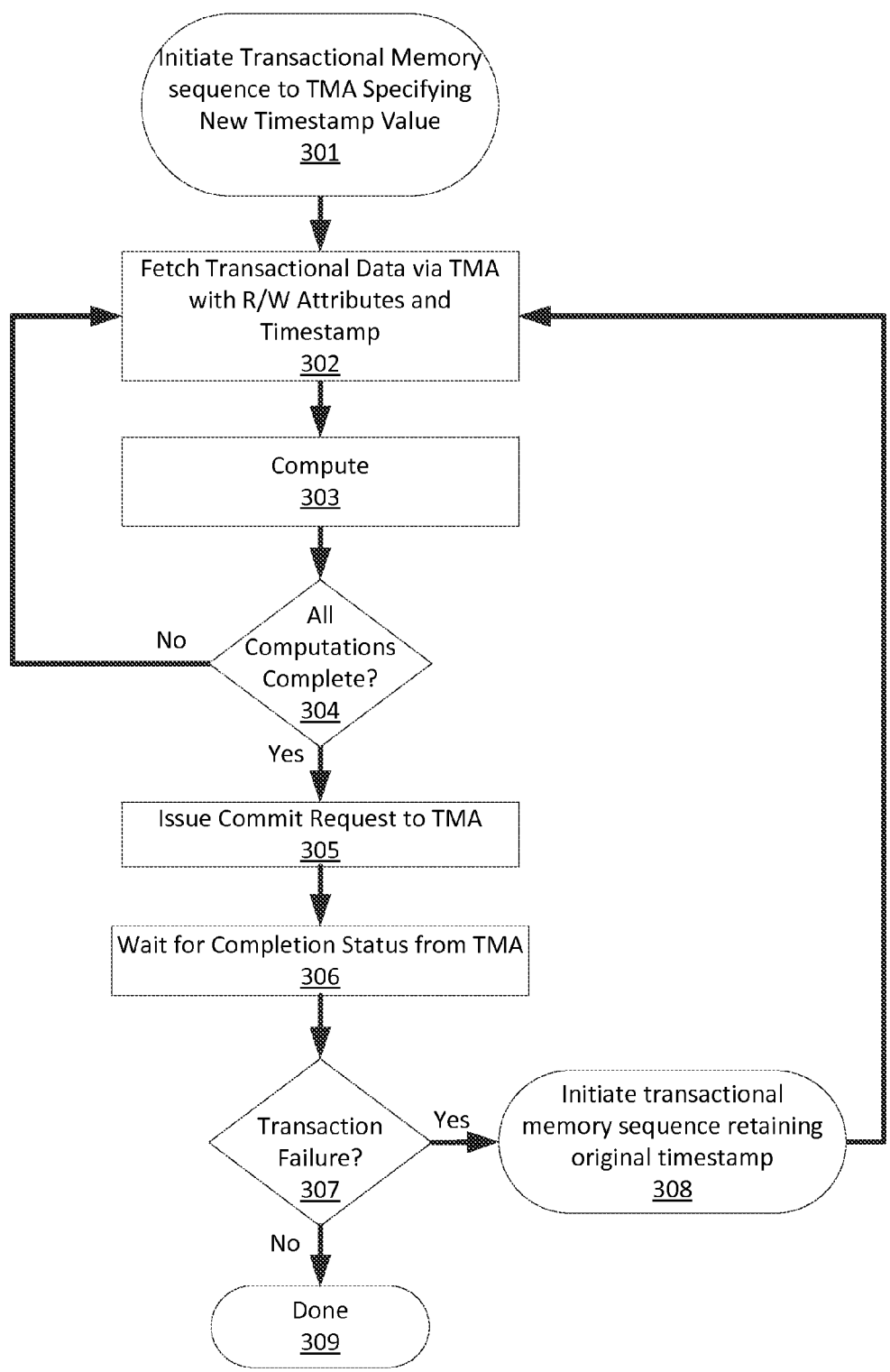
FIGURE: 3

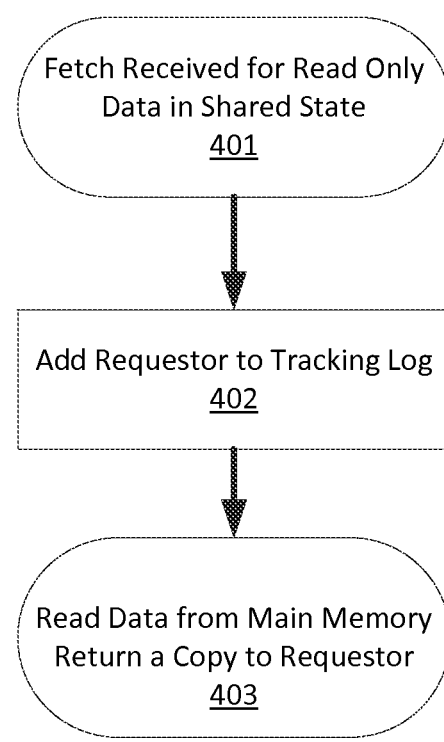
FIGURE: 4

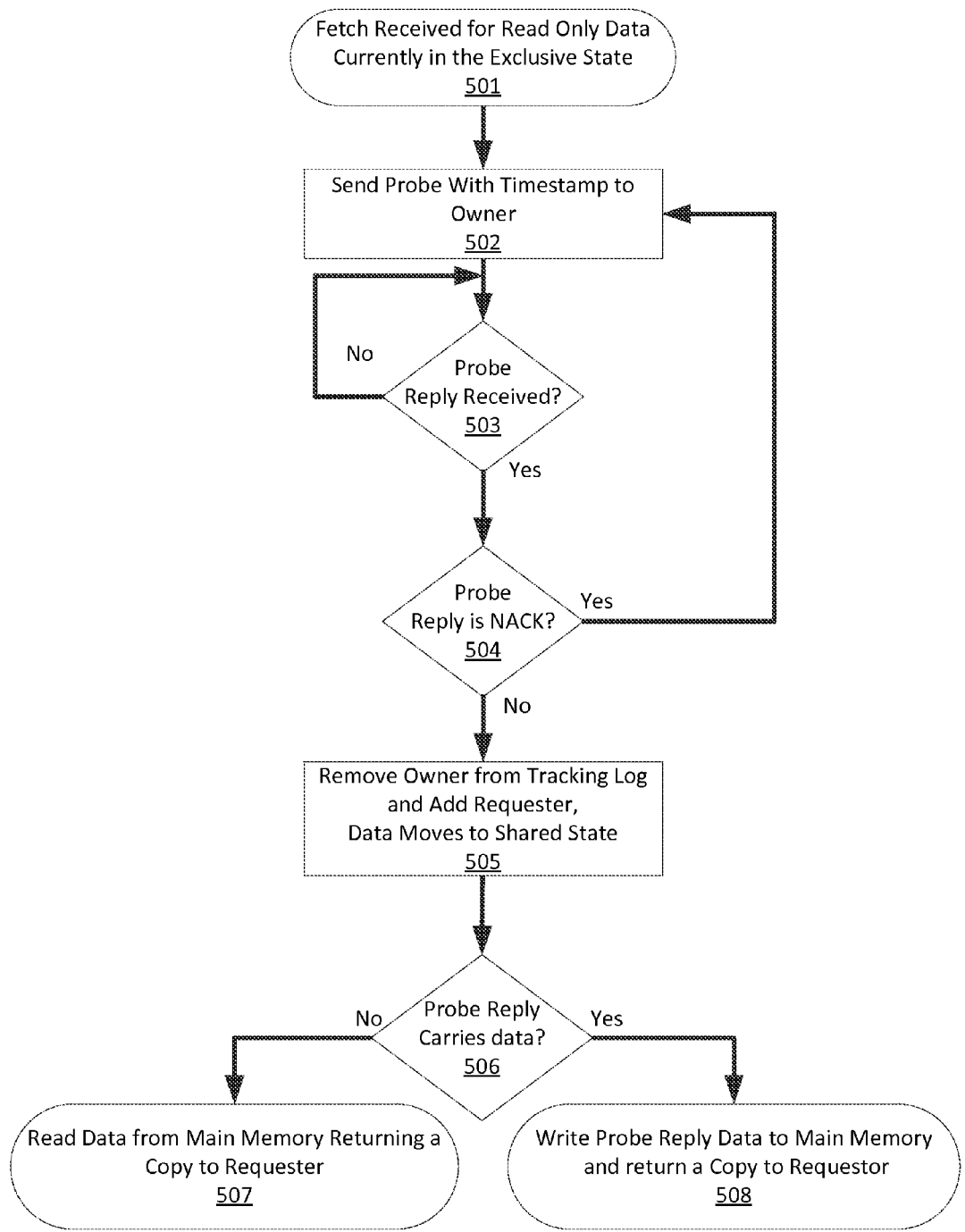
FIGURE: 5

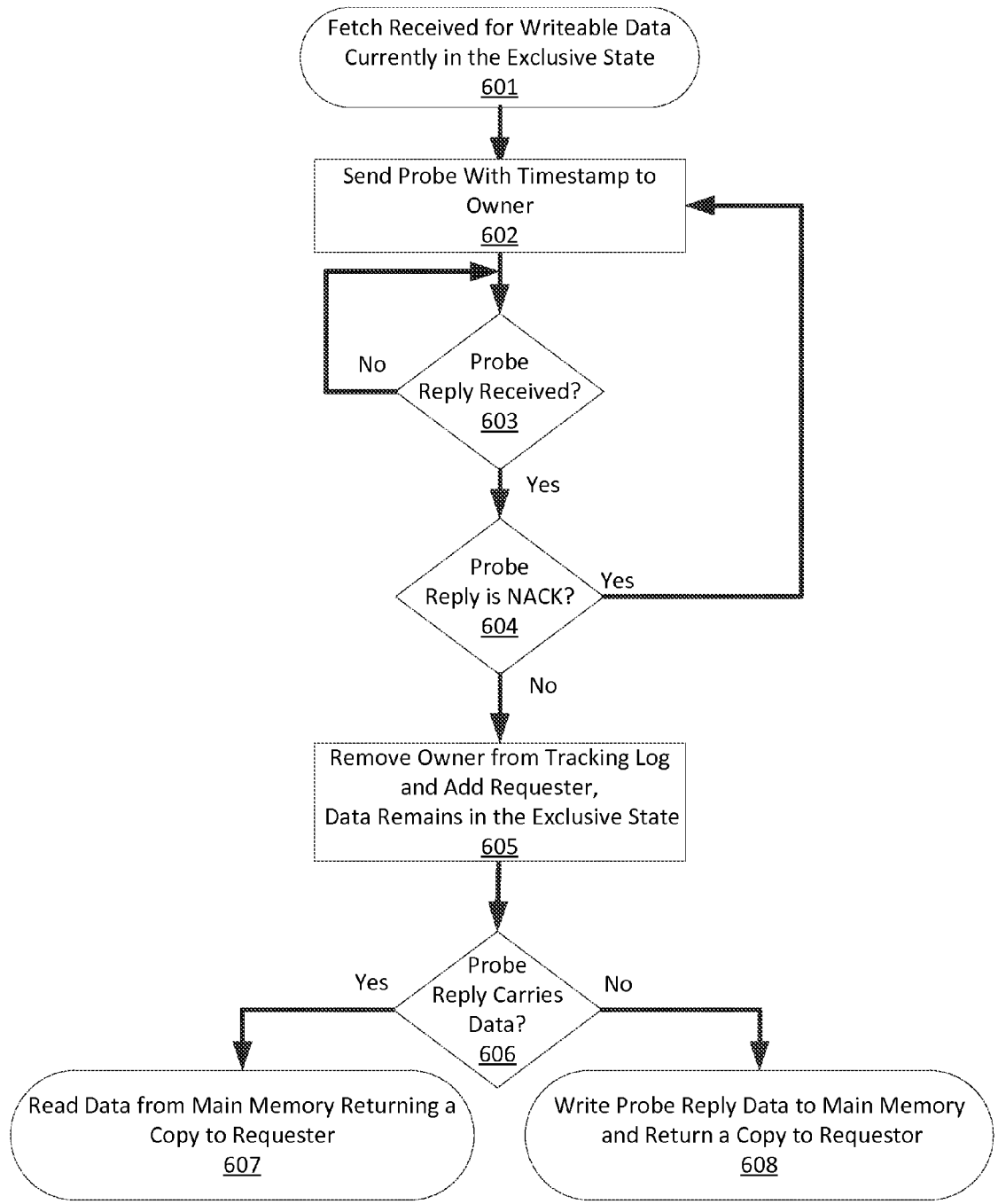
FIGURE: 6

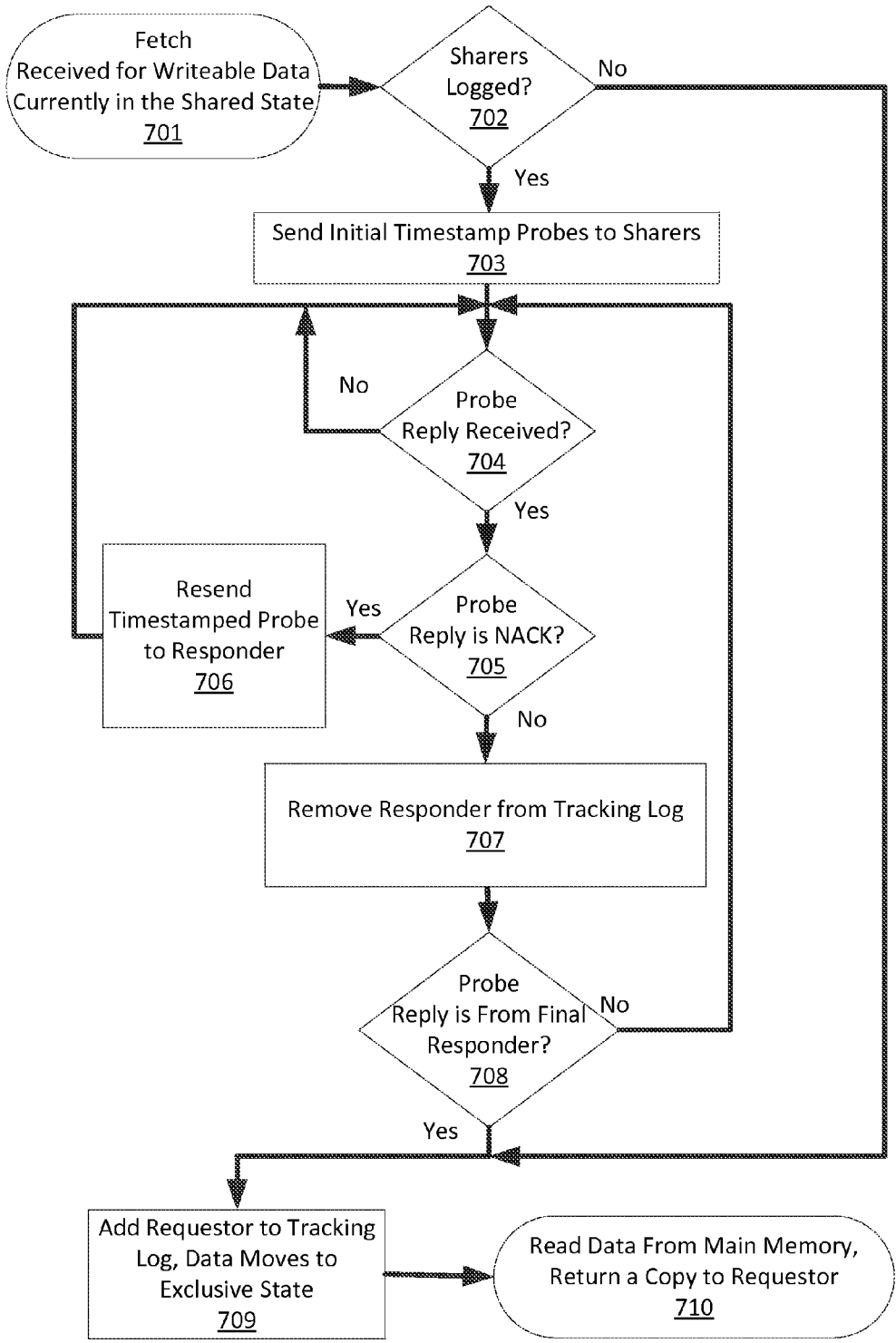
FIGURE: 7

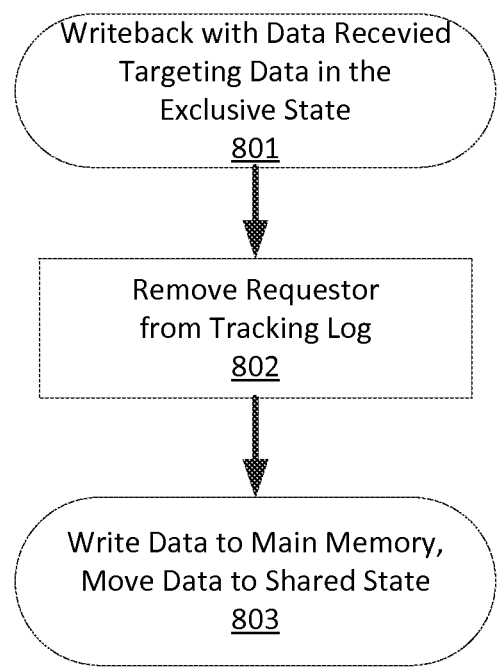
FIGURE: 8

TRANSACTIONAL MEMORY PROXY

CROSS REFERENCE TO RELATED APPLICATIONS

This application claims the priority of provisional application Ser. No. 61/696,047, titled "TRANSACTIONAL MEMORY PROXY" filed on Aug. 31, 2012, the disclosure of which is incorporated herein by reference.

BACKGROUND OF THE INVENTION

1. Field of the Invention

The present invention generally relates to offloading transactional memory accesses to a globally coherent memory system between compute nodes from processors in a compute node to a transactional memory agent that resides near the compute node.

2. Description of the Related Art

Current multiprocessor memory systems typically contain a globally coherent memory controller. The purpose of the globally coherent memory controller is to maintain coherency of the memory image across the cache hierarchy of all processors in the system. Today multi-processor systems frequently maintain multiple copies of pieces of data in separate locations. If one processor were to overwrite one copy of data and not other copies, the system would lose coherency. Thus to maintain coherency of data throughout the multi-processor system, the state of data residing in memory must be managed throughout the entire multi-processor system. This is referred to as managing the coherence of a globally shared memory.

Shared memory is a memory that is typically accessed by one or more processors. Shared memory is memory that may be accessed via a common address space with a plurality of other processors in a computer system In some computer architectures, shared memory is managed such that all copies of the data of that memory system that may be resident in one or more processor's cache hierarchy across the global domain of a multi-processor computer system are kept consistent via a global coherence protocol enforced by a globally coherent memory controller.

Globally coherent memory controller functions may be distributed across one or more nodes in a multi-processor computer system. Each individual node containing the physical memory associated within a globally shared memory system may perform globally coherent memory controller functions associated with the data physically local to that node. In particular, a globally coherent memory controller tracks the location or locations and state of individual pieces of data its local data.

The globally coherent memory controller also associates states to each individual piece of data. Commonly, coherently shared data states include at least a "shared state" and an "exclusive state". Data that is in the shared state can be read but not written. There may be one or more copies of a particular piece of data in the shared state that are cached in one or more of the processors in a globally coherent shared memory system. Data that is in the exclusive state has one and only one owner. Conventionally, the owner of data in the exclusive state is a processor. Data that is in the exclusive state can only be read or written by the owner of that data.

Data in the shared state is therefore referred to as "read only" data, and data in the exclusive state is referred to as "writeable" data. Processors containing a copy of shared memory in a shared state are commonly referred to as sharers.

Conventionally, when a processor wishes to write data that is currently in the shared state, that processor must first become the owner of the data. Before the data can be written that data must be transitioned to the exclusive state. The globally coherent memory controller administrates the transition of data from the shared state to the exclusive state.

The globally coherent memory controller enforces a coherence protocol, frequently using "snoops" or "probes". A snoop or probe is a query used by the globally coherent memory controller to check or change the status or state of data contained in shared memory. Examples of probes sent from the globally coherent memory controller include querying a processor if it has a copy of a particular piece of data, querying a processor running software if it has modified writeable data, commanding a processor to give up or delete a piece of data, and changing the state of a particular piece of data in a processor's cache hierarchy. Probes are part of a global coherence protocol that maintains coherence of the global memory. A global coherence protocol includes rules that govern when certain data may be shared, and when certain data must be exclusive.

Current transactional memory based communications require a processor to manage its own transactional requests for data being read from or written to shared memory. In conventional transactional memory implementations when errors or failures occur in a transactional memory data request, the processor must handle the failure which may require the processor to abort execution of the software running at the time of the failure The hardware addressing capabilities of a particular processor is another limitation of conventional transactional memory implementations. A particular commodity processor's hardware addressing capabilities may be limited to the number of address bits that a processor has.

New methods that overcome the limitations of processors performing their own transactional memory transactions are needed in order to support emerging 'big data' applications.

SUMMARY OF THE INVENTION

Certain embodiments of the invention relate to a system and method for offloading transactional memory accesses between compute nodes from processors in a compute node to a transactional memory agent or TMA that resides near the compute node. One object of the invention is to decouple the processor's memory access mechanism from the direct effects of system memory or interconnect failures. A second object of the invention is to allow the processor to address a memory space that is larger than the processor's native hardware addressing capabilities. Embodiments of the invention also allow processors in a compute node to perform computations without expending excessive cycles managing transactional operations with memory. Processors in the compute node may instruct the TMA to perform transactional memory accesses for them while they continue performing other tasks. TMA based transactional operations require a minor modification to the behavior of a conventional globally coherent memory controller.

Certain other embodiments provide a computer-implemented method of managing transactional memory requests of a processor in a multi-processor system. The TMA is configured to operate as a proxy for the processor for such activities. The TMA may perform various types of memory accesses such as reading read-only data, or reading and writing writeable data on behalf of a processor. As tracked by the globally coherent memory controller, the TMA is essentially the owner of the data it fetches, not the requesting processor. The TMA typically copies transactionally fetched data into a private region of memory associated with the requesting processor during transactional memory read operations, or moves data from the private memory region associated with that processor during the commit phase of transactional memory write operations.

Typically, the globally shared memory is a globally addressable distributed memory system. For each processor in the system, a private portion of the globally shared memory may by convention be set aside for access only by that processor. In other embodiments, the memory space where the TMA copies data to may be a private memory space exclusive to the processor.

In some embodiments, the method includes building a memory transaction for the memory transaction agent to conduct a combination of subcomponent transactional memory operations. The method may also initiate an atomic commit phase according to a transactional memory protocol wherein data written within the context of the transaction becomes globally visible to all agents in the system in a single indivisible action.

The method may also include communicating one or more transactional conflict related probe actions from the memory controller to the TMA. The memory controller may also receive a response to the transaction conflict related probe actions from the TMA. The probe response will typically be in accordance with the conventionally defined global coherence protocol.

Some embodiments of the invention include a global timestamp for each memory read request issued by the TMA. The global timestamp typically identifies when a TMA transaction was first initiated by a processor. In these embodiments, the method may also include transmitting or receiving a probe issued by a memory controller and carrying the global timestamp of a transaction related read request initiated by some agent in the system. The timestamp value supplied in a probe may be used by the TMA receiving it in determining whether to honor the probe or reject it based on whether any of the timestamps of transactions it is currently managing are older or younger than that of the probe request.

The method includes receiving a command from the processor providing one or more transaction variables to be written to the globally coherent memory. The method includes the steps of determining whether or not to write transaction variables to the globally coherent memory, and of writing the transaction variables to the globally coherent memory when transaction variables must be written. A transaction having received and honored one or more probes targeting data associated with that transaction may not complete the memory write operations for those variables.

In some implementations, determining when not to write the transaction variables is based in part on receiving an error, or receiving an indication that a write commit operation did not complete. Such a failure may be in response to a timeout. The method may also include retrying a failed write commit operation, or confirming cancellation of the failed write transaction.

Typically, the failure or aborting of the atomic write commit phase of a transaction is communicated back to the requesting processor via status or interrupt action.

BRIEF DESCRIPTION OF THE DRAWINGS

FIG. 1A illustrates transactional memory agents communicating with processors and with a globally coherent memory controller.

FIG. 1B illustrates a transactional memory agent acting as a proxy for a processor in a first node in communication with globally coherent memory in a second node.

FIG. 1C illustrates a transactional memory agent acting as a proxy for a processor in communication with globally coherent memory within a node.

FIG. 2 illustrates a compute node including a transactional memory agent communicating with a plurality of other compute nodes.

FIG. 3 is a method for performing a transaction sequence.

FIG. 4 is a method for handling read requests for shared data currently in the shared state.

FIG. 5 is a method for handling read requests for shared data currently in the exclusive state.

FIG. 6 is a method for handling read requests for writeable data currently in the exclusive state.

FIG. 7 is a method for handling read requests for writeable data current in the shared state.

FIG. 8 is a method for handling write back requests.

DETAILED DESCRIPTION

Figure 9:
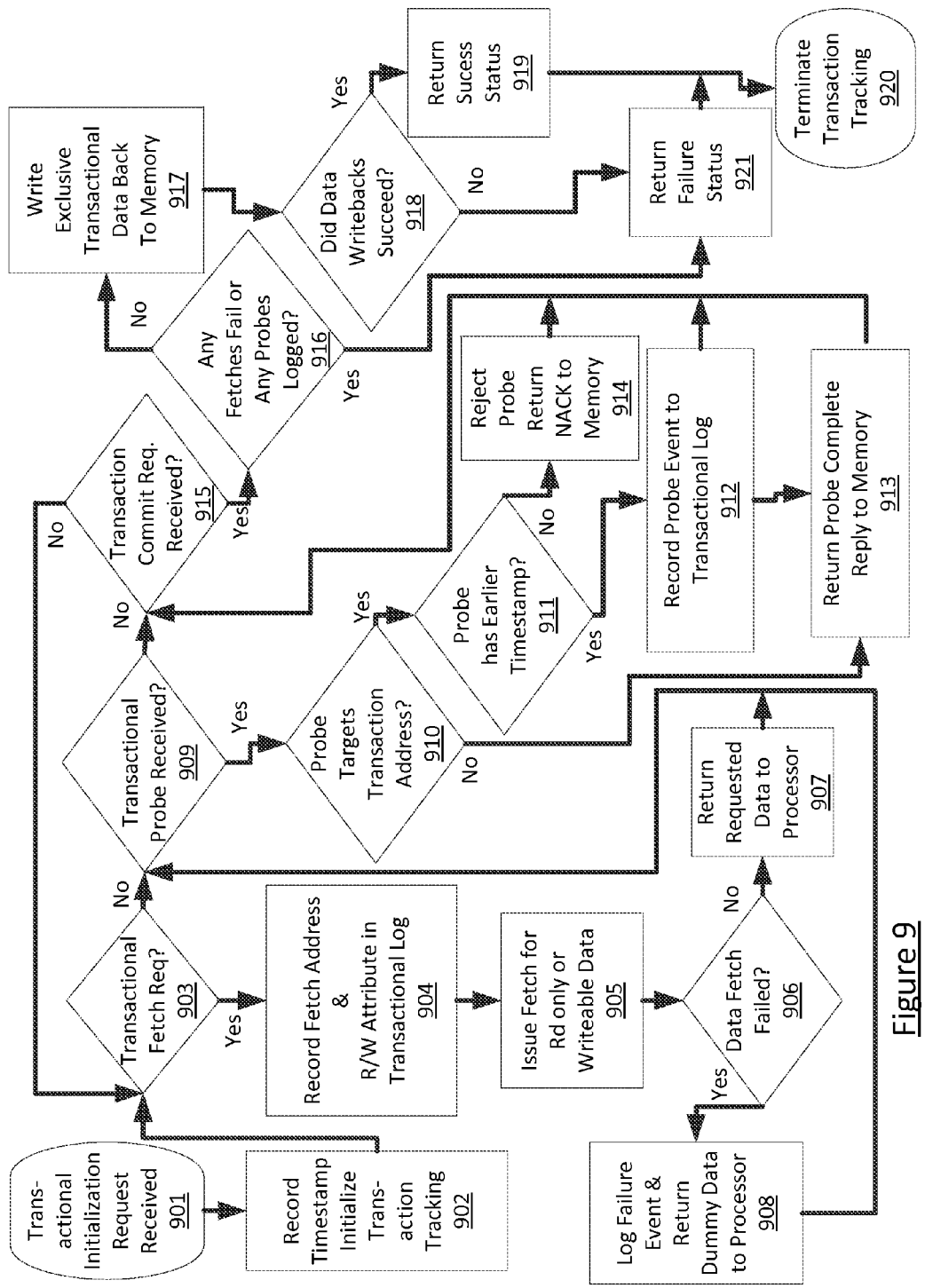
FIG. 9 is a method for general transaction flow.

Certain embodiments of the invention relate to a system and method for offloading memory accesses between compute nodes from processors in a compute node to a transactional memory agent that resides in or near the compute node. The present invention generally relates to offloading transactional memory accesses to a globally coherent memory system between compute nodes from processors in a compute node to a transactional memory agent that resides near the compute node. Transactional memory accesses involve a sequence of possibly multiple memory read and write operations to multiple memory locations which are in aggregate committed to physical memory as though they have occurred in a single atomic transaction.

The present technology may decouple the processor from the direct effects of remote system failures, and may free the processor from having to be aware of transactional memory semantics. The processor may be allowed to address a memory space that is larger than the processors native hardware addressing capabilities. Processors in a compute node may perform computations without expending excessive cycles managing data transactions to or from remote memory. Processors in the compute node may also instruct the transactional memory agent to perform memory access for them while they continue performing other tasks.

In certain embodiments of the invention, user level processor software is allocated a hardware Transactional Memory Agent (TMA) 'Thread'. The TMA is typically used as a proxy for fetching coherent copies of read-only data. The TMA may also be used for data operations requiring exclusive ownership for writeable data. A given TMA Thread can only handle one TMA Transaction at a time.

The TMA is the owner of data it fetches, not the attached processor. Data fetched via the TMA may be copied into a private area of processor's memory space. That private area then is essentially a software managed cache of transactional data. TMA is thus a vehicle allowing processor software to initiate decoupled, fully coherent interactions with global memory. The processor is therefore enabled to explicitly group together subcomponent transactions in an 'off-line' fashion leading to a subsequent coherence protocol including an atomic commit phase. A global coherent memory controller also provides functionality for communicating transaction conflict related probe actions to a processor allowing software to take appropriate actions.

In certain embodiments, the global coherent memory controller functionality also includes generating a probe response in accordance with the system global coherence protocol. In certain embodiments of the invention, where a reverse address translation mechanism is used, the TMA receives a probe from the global coherent memory controller and then forwards the probe to the processor with the virtual address associated with that probe. Then the software operating on the processor takes appropriate actions.

In some embodiments, the TMA references sent to memory carry a global timestamp identifying when the overall transaction was first initiated. Any probes issued by the globally coherent memory controller that result from a transactional fetch of data will carry the timestamp of the request that produced the probe. This allows a determination to be made at the targeted TMA(s) as to whether a probe has priority to proceed. A probe with priority is honored by the TMA which then records the fact of the honored probe and responds the probe with a completion reply. Subsequently, the transaction(s) managed by the TMA that had a copy of the data targeted by the probe will be terminated with a failure status returned to the initiating processor.

When the probe does not have priority, the probe may be aborted, or the probe may be retried for the conflicting outstanding transaction. An abort is a rejection of a probe request commonly referred to as a negative acknowledgement or a "NACK". Since the probe with the oldest timestamp will be given priority, the timestamp must be sufficiently precise to ensure timely forward progress of all threads performing transactional memory accesses. Probes also typically include a unique TMA Thread ID that is used to resolve timestamp ties.

In certain instances, a reverse address translation mechanism is used to convert TMA directed probes that target physical addresses into probes that access virtual addresses. This allows software to implement appropriate transactional and coherence semantics.

One advantage of such a proxy relationship is that the processor is effectively decoupled from the direct effects of remote system failures such as uncorrectable memory errors, link failures, etc.

Typically, TMA resources are directly user accessible with appropriate provisions made to isolate unsafe behavior through virtual memory mappings. Individual transactions can involve hundreds to thousands of bytes of physically unrelated data. Using the TMA mechanism is somewhat similar to using I/O transfers to communicate between system nodes except that the data involved is coherently tracked during the duration of the transaction and all of the resulting data modifications are committed in a single monolithic globally visible event.

Typically, a TMA Transaction begins with a software-directed acquisition phase to fetch coherently tracked copies and/or ownership of various data. Provisions are included that protect all data acquired within the transaction from being modified by other processes (while also ensuring eventual forward progress for all executing processes that may be contending for such data).

Barring an early abort, the process typically continues by performing computations and manipulations on the acquired data along with additional acquisition steps that may also dynamically occur during this phase of the process. Typically transactional memory requests may also be aborted by the processor that initiated the transactional memory request. In certain embodiments of the invention the TMA may support aborting a transactional memory request.

Successful TMA transactions then complete under software direction with a commit phase that involves atomically writing all modified components of the transactional data to memory. This step may succeed or fail depending on detected errors or preemptive conflicts for access to transactional data that may have occurred prior to the commit step. In the case of a commit failure, the transactional memory request is aborted cleanly allowing software to attempt retries or take other corrective measures.

In some instances, the present technology may mix transactional and non-transactional memory traffic within the same memory system. This allows the present technology to be more flexible in the type of traffic it may handle.

FIG. 1A illustrates transactional memory agents communicating with processors and with a globally coherent memory controller. The FIGURE includes processor 1 in transactional memory agent 4, and one or more globally coherent memory controller(s) 5. FIG. 1A also contains processor 6, and transactional memory agent 8. Processor 1 is in communication with its own private memory 2, and with a portion of shared memory 3. Processor 6 is in communication with its own private memory 7, and with a portion of shared memory 8. Global coherent memory controller(s) 5 maintains logs identifying what data is stored in the cache hierarchy of processor 1 and what data is stored in the cache hierarchy of processor 6. Global coherent memory controller(s) 5 also maintains a record of the state of individual pieces of data contained within cache hierarchies. Each processor in FIG. 1A is configured to pass transactional data requests to a transactional memory agent. Processor 1 passes transactional data requests to transactional memory agent 4. Processor 6 passes transactional data requests to transactional memory 8. The transactional memory agents 4, 8 perform transactional memory reads or writes global shared memory as a proxy for their respective processor 1, 6. Globally coherent memory controller(s) 5 manages when a transactional memory agent can read or write data to global shared memory. The globally coherent memory controller(s) enforce a global coherence protocol. In some embodiments of the invention the transactional memory agents read data from or write data to their processors private memory. In other embodiments of the invention data is passed to processor directly from its transactional memory agent. In yet other embodiments data is passed to the transactional memory agent by software running on the processor. When committing data to be written, a transactional memory agent will send write data to shared memory under the supervision of the globally coherent memory controller(s) 5.

FIG. 1B illustrates a transactional memory agent in acting as a proxy for a processor in a first node in communication with globally coherent memory in a second node. The second node may be the same node as the processor in which case data is transported with the same transactional protocol between the local processors private memory and the local shared memory. FIG. 1B depicts two compute nodes, compute node 10 and compute node 20. Each of the two compute nodes 10, 20 contains a global coherent shared memory controller 101, a transactional memory agent 102, a processor 103, and private memory belonging to the processor 104. A global coherent memory controller 101 is in communication with a transactional memory agent 102. The transactional memory agent 102 in each compute node 10 and 20 communicates with the processor 103, the processor's private memory 104, and the globally coherent shared memory controller 101 within a particular node. The private memory may be a dedicated region within the globally coherent shared memory space. In some embodiments, TMAs may not communicate with each other but rather with globally coherent memory, such as for example specifically the memory controller.

When the processor 103 in compute node 10 requires shared memory data located at the globally coherent memory controller 101 on compute node 20, the processor 103 in compute node 10 instructs the transactional memory agent 102 on compute node 10 to fetch the data from compute node 20. The transactional memory agent 102 in compute node 10 communicates the request for data to the globally coherent memory controller 101 on compute node 20. The memory controller 101 on compute node 20 sends that data to the transactional memory agent 102 on compute node 10. Then, in certain embodiments of the invention, the transactional memory agent 102 on compute node 10 places the data into the local processor's private memory 104 on compute node 10, and informs the processor 103 on compute node 10 that the memory read is complete. In other embodiments of the invention the processor 103 may poll the transactional memory agent 102 to see if the transactional memory agent 102 has received the data before copying the data to the processor's private memory 104. In still other embodiments, upon issuing a transactional read request, the processor 103 on compute node 10 may begin attempting to read the data directly from TMA related resources and may be stalled doing so until the request's transactional data is returned from the memory controller 101 on compute node 20. The processor 103 on compute node 10 then can use the requested data to perform computations. The transactional memory read operation reviewed above is an exemplary embodiment of the invention, the description is not meant to limit the scope of the invention in any way.

When the processor on compute node 10 wishes to write transactional data to the shared memory at the globally coherent memory controller 101 on compute node 20, a similar process is invoked. First, the processor 103 on compute node 10 instructs the transactional memory agent on compute node 10 to perform a write to shared memory at the globally coherent memory controller 101 on compute node 20. Next, the transactional memory agent on 102 compute node 10 communicates the write data to the memory controller 101 on compute node 20. The globally coherent memory controller 101 on compute node 20 then writes the data to its local globally coherent shared memory, and informs the transactional memory agent 102 on compute node 10 that the write is complete. Finally, the transactional memory agent 102 on compute node 10 informs the processor 103 on compute node 10 that the write is complete. The memory write operation reviewed above is an exemplary embodiment of the invention, the description is not meant to limit the scope of the invention in any way.

The transactional memory agents 102 in each of the compute nodes 10, 20 are configured to act as a proxy for performing transactional memory operations for their local processors 103 targeting shared memory across any of the compute nodes within a distributed globally shared memory computer system. Thus, the invention may scale to include any number of nodes.

Embodiments of the invention may include software running on a processor implementing the method of the invention. The transactional memory agent itself may include a processor running software instructions implementing TMA functions. Alternatively, the transactional memory agent may be implemented in part or entirely in hardware. The transactional memory agent may include a memory.

In certain embodiments of the invention, the transactional memory agent functions may be executed by a processor core in a processor socket containing a plurality of processor cores. In such an embodiment, the processor core implementing a TMA function will still perform read or write transactions to global memory for another processor or processor core as a proxy.

FIG. 1C illustrates a transactional memory agent acting as a proxy for a processor in communication with globally coherent memory within a node. FIG. 1C depicts a single compute node 10. Compute node 10 contains a global coherent memory 101, a transactional memory agent 102, a processor 103, and private memory belonging to the processor 104. A global coherent memory 101 is in communication with a transactional memory agent 102.

In FIG. 1C, the global coherent memory 101 is in communication with a transactional memory agent 102. The transactional memory agent 102 is also in communication with processor 103 and the processor's private memory 104. The transactional memory agent 102 is configured to act as a proxy for performing memory transactions for the processor 103 with the globally coherent memory 101. Typically, the processor 103 passes a memory read or write request to the transactional memory agent 102, and the transactional memory agent 102 performs the memory transaction with the globally coherent shared memory 101 for the processor 103. When the global memory transaction is a read, the transactional memory agent 102 fetches data from the globally coherent memory, places that data into the processor private memory 104, and then informs the processor that the read operation is complete. The transactional memory agent 102 may also cache a copy of that data for subsequent re-use in another transactional memory access to the same address. The processor 103 then uses the data to perform computations. When writing, the processor 103 commands the transactional memory agent 102 to write data to the globally coherent shared memory 101, and the transactional memory agent 102 handles the write operation. In contrast, a processor in the conventional computer system performs its own global memory transfers. Thus, in conventional computer system architectures, processors may spend more of their time performing global memory transactions. The invention thus enables processor 103 to spend more of its time performing computations and spend less of its time being concerned with transactional memory transfers.

FIG. 1C also shows an exploded (internal) view of the transactional memory agent 102'. This exploded view of the transactional memory agent 102' includes a plurality of transactional thread state resource 102B, an optional reverse address translation mechanism 102C, and coherent request tracking resources 102A. FIG. 1C depicts instructions being sent from the processor to the transactional memory agent adding a thread 105 to the plurality of transactional threads 102B. The FIG. 1C also shows probe 106 going through the reverse address translation mechanism 102C being sent to the processor 103 where processor software determines how to handle the probe Alternatively, the TMA may includes a hardware mechanism for keeping track of the addresses and associated R/W attributes for each transactional thread and handles the probes directly.

FIG. 2 illustrates a compute node including a transactional memory agent communicating with a plurality of other compute nodes. FIG. 2 depicts a compute node 201 including a plurality of processors 202 each in communication with a transactional memory agent 204 within a node controller 203. FIG. 2 also depicts the transactional memory agent 204 in the compute node 201 in communication with a plurality of other compute nodes 205. Each of the other compute nodes 205 in FIG. 2 also contains a plurality of processors and a transactional memory agent in a node controller. Each TMA may communicate with an associated processor and various memory controllers across the system of compute nodes. For simplicity, the processors, transactional memory agents, and node controllers in the other compute nodes 205 are not numerically identified in FIG. 2.

Each node may include a globally coherent shared memory controller. A TMA for a node may communicate with a local processor on a compute node and the shared memory controllers of all other compute nodes in the system.

FIG. 3 is a general overview of a method for performing a transaction sequence. A transactional memory sequence is initiated to a transactional memory agent at step 301. The transactional memory request may include a new timestamp value. Transaction data may be fetched by the transactional memory agent at step 302. The transaction data may include read/write attributes and a timestamp. Computations are performed after data has been fetched by the transactional memory agent at step 303. Whether all computations have completed is evaluated at step 304. If all computations are not complete, additional data may be fetched by the processor via the transactional memory agent and the method returns to step 302. When all current computations have completed, a commit request is sent to the TMA at step 305. This is where the transactional memory agent commits write data to be written directly to physical memory. The system waits until a completion status from the transactional memory agent is received at step 306. At step 307, a determination is made as to whether there has been a transaction failure. If a failure has occurred, another transaction memory sequence may be initiated to the same addresses and using the same timestamp at step 308. The method then returns to step 302 where the process repeats the transactional memory access. If there is no failure step 307, the method ends at step 309.

FIG. 4 is a method for handling read requests for shared data currently in the shared state. A memory controller receives a request from a TMA for read-only data in the shared state at step 401. The requestor is added to the list of sharers in the tracking log of the global coherent memory controller at step 402. Then, data, such as for example time data or other data, is read from physical memory and a data copy is returned to the requestor at step 403.

FIG. 5 is a method for handling read requests for shared data currently in the exclusive state. A fetch for read-only data is received from a TMA by the memory controller at step 501. The global coherent memory controller sends a probe with a timestamp to the recorded exclusive owner of the data at step 502. At step 503, the global coherent memory controller waits for a reply to the probe. When a probe response is received at step 503, it is evaluated at step 504. If the evaluation determines the probe reply is a NACK, the method returns to step 502 where another probe with the same time stamp may be sent.

When at step 504 the probe is not a NACK, for example if the probe reply is a completion acknowledgement, the previous owner may be removed from the tracking log of the global coherent memory controller, the new requestor is added to the tracking log in the global coherent memory controller, and the state of the requested data is moved to the shared state at step 505. At step 506, a determination is made as to whether the probe reply carries data. In some embodiments, the global coherent memory controller may determine whether the probe reply carries data associated with the request. If the probe reply is complete without data at step 506, a copy of the requested data is read directly from physical memory and a copy is returned to the requestor at step 507. If the probe is complete including data associated with the request, that data would then be written to update physical memory and regardless a copy is returned to the requestor at step 508.

FIG. 6 is a method for handling read requests for writeable data currently in the exclusive state. A fetch for writable data in the exclusive state is received at step 601. The fetch may be received by the memory controller from a transactional memory agent. The global memory controller may send a probe with the timestamp and transaction ID taken from the original read request to the recorded exclusive owner of the requested data at step 602. The global coherent memory controller waits until a probe reply is received at step 603. Once a probe reply is received, a determination is made as to whether the probe reply is NACK at step 604. The global coherent memory controller may determine if the probe was a NACK or not.

If the probe was a NACK at step 604, a new probe may be sent with the same timestamp as the earlier probe as the method returns to step 602. When the probe reply is not a NACK, the owner of the data may be removed from the owner tracking log stored in the global coherent memory controller, the requestor is added to the tracking, and data remains in the exclusive state at step 605.

The global coherent memory controller may then determine if the probe reply is complete with or without data associated with the request at step 606. When the probe reply is complete without, data is read from physical memory returned to the requestor at step 607. When the probe reply is complete with data, the returned data is written to physical memory and a copy of the data is returned to the requestor by the transactional memory agent at step 608.

FIG. 7 depicts a method for servicing a request for writeable data currently in the shared state. A memory controller receives a request for writeable data currently in the shared state at step 701. The request may be a fetch command received from a TMA. In step 702, the memory controller evaluates whether any sharers are logged as having a copy of the requested data. If not, the requested is added as the exclusive owner to the tracking log in the global coherent memory controller, and data is moved to the exclusive state at step 709. If sharers are logged in the global coherent memory controller at step 702, initial probes with timestamps are sent to each of the sharer nodes at step 703.

A memory controller waits to receive probe replies at step 704. When a probe reply is received, the probe reply is evaluated to determine if the reply is a NACK at step 705. When a probe reply is a NACK, another probe is sent to the responder at step 706. In some instances, the first probe is re-sent with time stamp to the responder at step 706. The method of FIG. 7 then returns to step 704. If, however, the probe reply is not a NACK, the responder is removed from the tracking log in the global coherent memory controller at step 707 and the method proceeds to step 708.

The global coherent memory controller evaluates whether a completion probe reply has been received for all outstanding probe requests at step 708. If the reply is not from the final responder, the method returns to step 704 where the global coherent memory controller awaits additional probe responses. When the probe reply is from the final responder, the requestor is added to the tracking log and data is moved to the exclusive state at step 709. After step 709, data is read from main memory and a copy is returned to the requestor at step 710.

FIG. 8 illustrates a method for handling write back requests. Copies of data modified during the course of a transactional memory sequence must be written back to by the TMA on behalf of its local processor(s). At step 801, the memory controller receives a writeback command. The requestor is removed from the tracking log in the global coherent memory controller at step 802. The data is written back to physical memory and the data is moved to the shared state at step 803.

FIG. 9 is a method for general flow of a transactional thread sequence as viewed from the perspective of the TMA. FIG. 9 begins with step 901 when a transactional memory sequence thread is initiated by the processor which at that time provides a timestamp identifying when the processor first entered a software transactional code sequence. In step 902, the transactional memory agent allocates a transactional thread resource and initializes the associated transactional thread log recording the provided time stamp, assigning a unique transaction ID for the thread, and clearing any old state remaining from a previous transactional sequence. Flow then proceeds to decision step 903, if there are any transactional fetch requests pending for that transactional thread at this time flow proceeds to step 904, otherwise flow proceeds to step 909. At step 904, the transactional memory agent records the fetch address for a data request and records read-only/writeable attributes associated with the data request in the transactional log of the associated thread. Flow then proceeds to step 905 where fetches for read only or writeable data are sent to the globally coherent shared memory. At step 906, the transactional memory agent determines if a data fetch has failed. If the data fetch did not fail, flow proceeds to step 907 and data is returned to the processor that initiated the data request by the transactional memory agent. If the fetch failed, in certain embodiments of the invention, the failure is logged and dummy data is returned to the processor that initiated the request by the transactional memory agent. Steps 907, and 908 both proceed to step 909.

At step 909 in FIG. 9, the TMA determines if a transactional probe has been received for the thread in question. If the transactional probe has not been received, flow proceeds to step 915. If a transactional probe has been received, flow proceeds to step 910. At step 910, the TMA evaluates whether the probe targets transactionally tracked address. If not, flow proceeds to step 913 where a probe complete message is returned from the TMA to the global coherent memory controller. When the probe targets a transactionally tracked address at step 910, flow proceeds to decision step 911. At step 911, the probe's combined timestamp and transaction ID is evaluated to see if it carries an earlier timestamp than that of any threads currently tracking the address targeted by the probe. If for some thread the answer is yes, the probe event has priority and state is recorded in the transaction log of that thread indicating that the eventual commit phase of the associated transaction must fail. When the probe's time stamp is not the earliest at step 911, a NACK is to the memory controller the issued the probe. Steps 912, 913, and 914 each flow to step 915.

At step 914 in FIG. 9, the transactional memory agent determines if a commit request has been received for an active thread from the processor indicating that the computational phase of that thread is complete. The commit request includes an indication of which transactionally tracked data has been modified by the processor and must be written back to the globally shared memory. If a commit request has been received for an active thread, a process to write back the modified data is initiated beginning in step 916. If at step 915 a commit request has not been received, flow proceeds back to step 903 in the flow diagram. At step 916, the transactional memory agent determines if there have been any failed fetches or if any probes were logged as preempting the commit phase of the thread in question. Where there are no failed fetches or probes logged, flow proceeds to step 917 where any modified transactional data is written back to memory. After step 917, flow proceeds to step 918. At step 918, the transactional memory agent determines if the writeback succeeded. If yes, program flow proceeds to step 919 where success status is returned to the processor that initiated the writeback. If at step 918 the transactional memory agent determines that the write back failed, flow proceeds to step 921 where failure status is returned to the processor that initiated the commit request. Steps 919 and 921 both proceed to step 920 where transaction tracking for the thread is terminated, and the flow chart ends.

The steps identified in FIGS. 3-9 above (and the order thereof) are exemplary and may include various alternatives, equivalents, or derivations thereof including but not limited to the order of execution of the same. The steps of the methods of FIGS. 3-9 (and its various alternatives) may be embodied in hardware or software including a non-transitory computer-readable storage medium (e.g., an optical disc or memory card) having instructions executable by a processor of a computing device. A user may launch or activate the method of FIGS. 3-9 by opening or activating an application in a computing device including a mobile computing device.

Figure 10:
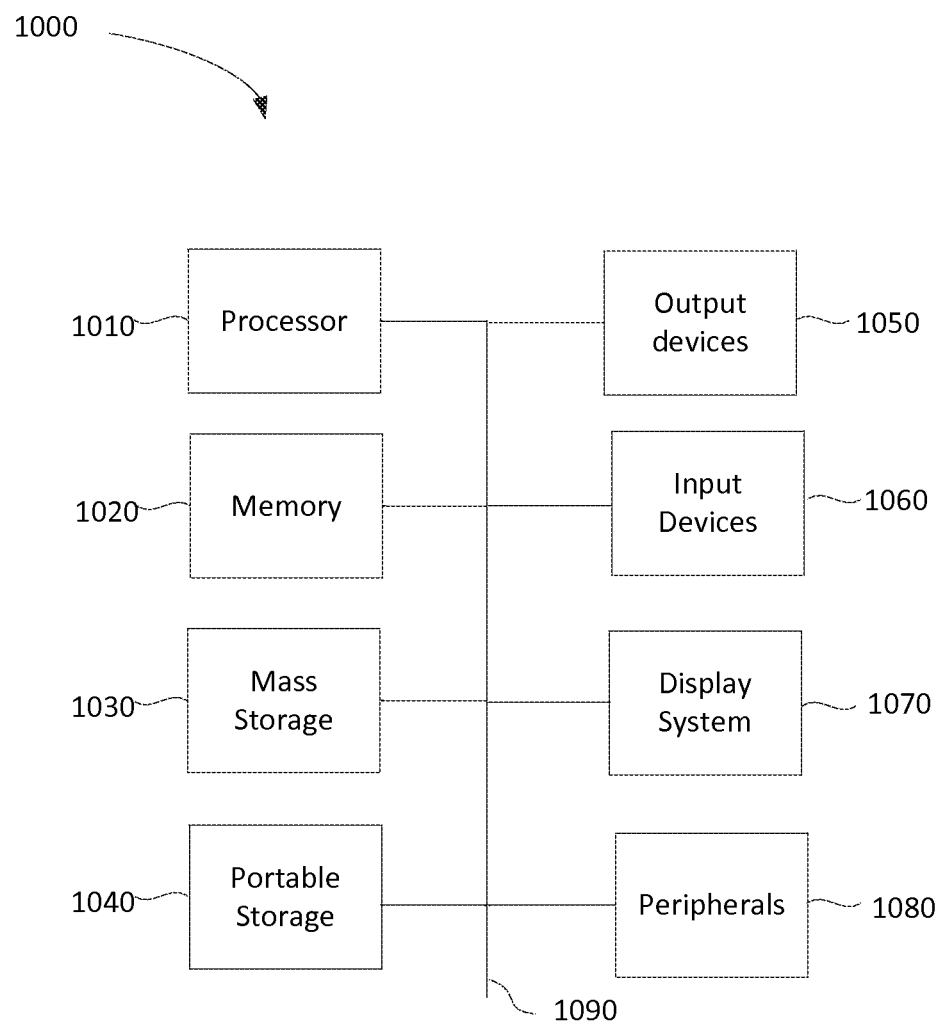
FIG. 10 illustrates an exemplary computing system that may be used to implement an embodiment of the presently claimed invention.

FIG. 10 illustrates an exemplary computing system 1000 that may be used to implement an embodiment of the presently claimed invention. In some embodiments, the computing system 1000 may be used to communicate with a transactional memory agent 204. The computing system 1000 of FIG. 10 includes one or more processors 1010 and memory 1020. Main memory 1020 stores, in part, instructions and data for execution by processor 1010. Main memory 1020 can store the executable code when in operation. The system 1000 of FIG. 10 further includes a mass storage device 1030, portable storage medium drive(s) 1040, output devices 1050, user input devices 1060, a graphics display 1070, and peripheral devices 1080.

The components shown in FIG. 10 are depicted as being connected via a single bus 1090. However, the components may be connected through one or more data transport means. For example, processor unit 1010 and main memory 1020 may be connected via a local microprocessor bus, and the mass storage device 1030, peripheral device(s) 1080, portable storage device 1040, and display system 1070 may be connected via one or more input/output (I/O) buses.

Mass storage device 1030, which may be implemented with a magnetic disk drive or an optical disk drive, is a non-volatile storage device for storing data and instructions for use by processor unit 1010. Mass storage device 1030 can store the system software for implementing embodiments of the present invention for purposes of loading that software into main memory 1020.

Portable storage device 1040 operates in conjunction with a portable non-volatile storage medium, such as a floppy disk, compact disk or Digital video disc, to input and output data and code to and from the computer system 1000 of FIG. 10. The system software for implementing embodiments of the present invention may be stored on such a portable medium and input to the computer system 1000 via the portable storage device 1040.

Input devices 1060 provide a portion of a user interface. Input devices 1060 may include an alpha-numeric keypad, such as a keyboard, for inputting alpha-numeric and other information, or a pointing device, such as a mouse, a trackball, stylus, or cursor direction keys. Additionally, the system 1000 as shown in FIG. 10 includes output devices 1050. Examples of suitable output devices include speakers, printers, network interfaces, and monitors.

Display system 1070 may include a liquid crystal display (LCD) or other suitable display device. Display system 1070 receives textual and graphical information, and processes the information for output to the display device.

Peripherals 1080 may include any type of computer support device to add additional functionality to the computer system. For example, peripheral device(s) 1080 may include a modem or a router.

The components contained in the computer system 1000 of FIG. 10 are those typically found in computer systems that may be suitable for use with embodiments of the present invention and are intended to represent a broad category of such computer components that are well known in the art. Thus, the computer system 1000 of FIG. 10 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims.

What is claimed is:

1. A method for optimizing performance of transactional memory accesses, the method comprising:
    allocating a transactional memory agent to one or more processors in a compute node;
    performing global memory transactions for a processor of the one or more processors in the compute node by the allocated transactional memory agent;
    receiving a transactional read request from the processor of the one or more processors by the transactional memory agent;
    copying data from one or more globally shared memory addresses identified by the transactional read request into a private region of memory associated with the processor by the transactional memory agent, wherein the globally shared memory addresses are at a globally shared memory that is a globally coherent memory;
    receiving a transactional write request from the processor of the one or more processors by the transactional memory agent;
    sending data from the private region of memory associated with the processor by the transactional memory agent for storage in the globally shared globally coherent memory after receiving the transactional write request;
    receiving a command from the processor of the one or more processors, wherein the command includes one or more transaction variables to be written the globally shared memory; and
    sending the one or more transaction variables to the globally shared memory for storage.

2. The method of claim 1, wherein the transactional memory agent is configured to handle one memory transaction with the global memory at a time.

3. The method of claim 1, wherein the globally shared memory is shared by the one or more processors and is a globally addressable distributed memory system.

4. The method of claim 1, wherein the private region of memory associated with the processor of the one or more processors is a private memory space exclusive to the processor of the one or more processors.

5. The method of claim 1, further comprising:
    building a memory transaction for the transactional memory agent to conduct from a combination of sub-component memory transactions; and
    initiating an atomic commit phase according to a global coherence protocol.

6. The method of claim 1, further comprising the transactional memory agent:
    receiving one or more transaction conflict related probe actions from a memory controller;
    generating a probe response to the one or more transaction conflict related probe actions from the processor response in accordance with a global coherence protocol; and
    transmitting the generated probe response to the memory controller.

7. The method of claim 1, wherein a global timestamp coupled with a unique transaction identifier (ID) are included with each memory transaction communication from the transactional memory agent, wherein the global timestamp identifies when the overall transaction was initiated.

8. The method of claim 7, wherein a probe carries the global timestamp and the unique transaction ID associated with a transactional request.

9. The method of claim 1, wherein the transaction memory agent negative acknowledges (NACKs) probe requests from a globally coherent shared memory controller based on time stamp and transaction identifier (ID) comparisons, wherein the memory controller automatically retries the probe requests until they terminate with a probe completion reply.

10. The method of claim 1, further comprising providing or maintaining a reverse address translation mechanism, wherein the reverse address translation mechanism provides a mapping between globally coherent memory controller directed probes that target physical addresses, and probes that communicate with one or more virtual addresses.

11. The method of claim 10, further comprising receiving an error indicator indicating that the write of the one or more transaction variables failed to complete within a threshold amount of time, wherein the one or more transaction variables is not written to the globally coherent memory after receiving the error indicator.

12. The method of claim 1, further comprising at least one of retrying a failed write transaction and confirming cancellation of the failed write transaction.

13. The method of claim 1, wherein the memory transactions include transactional memory traffic and non-transactional memory traffic.

14. A non-transitory computer readable storage medium having embodied thereon a program executable by a processor to perform a method, the method comprising:
    allocating a transactional memory agent to one or more processors in a compute node;
    performing global memory transactions for a processor of the one or more processors in the compute node by the allocated transactional memory agent;
    receiving a transactional read request from the processor of the one or more processors by the transactional memory agent;

copying data from one or more globally shared memory addresses identified by the transactional read request into a private region of memory associated with the processor by the transactional memory agent, wherein the globally shared memory addresses are at a globally shared memory that is a globally coherent memory;

receiving a transactional write request from the processor of the one or more processors by the transactional memory agent;

sending data from the private region of memory associated with the processor by the transactional memory agent for storage in the globally shared globally coherent memory after receiving the transactional write request;

receiving a command from the processor of the one or more processors, wherein the command includes one or more transaction variables to be written the globally shared memory; and sending the one or more transaction variables to the globally shared memory for storage.

15. The non-transitory computer readable storage medium of claim 14, wherein the transactional memory agent is configured to handle one memory transaction with the global memory at a time.

16. The non-transitory computer readable storage medium of claim 14, wherein the globally shared memory is shared by the one or more processors and is a globally addressable distributed memory system.

17. The non-transitory computer readable storage medium of claim 14, wherein the private region of memory associated with the processor of the one or more processors is a private memory space exclusive to the processor of the one or more processors.

18. The non-transitory computer readable storage medium of claim 14, the program further executable to:
build a memory transaction for the transactional memory agent to conduct from a combination of subcomponent memory transactions; and
initiate an atomic commit phase according to a global coherence protocol.

19. The non-transitory computer readable storage medium of claim 14, the program further executable to:
receive one or more transaction conflict related probe actions from a memory controller;
generate a probe response to the one or more transaction conflict related probe actions from the processor response in accordance with a global coherence protocol; and
transmit the generated probe response to the memory controller.

20. The non-transitory computer readable storage medium of claim 14, wherein a global timestamp coupled with a unique transaction identifier (ID) are included with each memory transaction communication from the transactional memory agent, the global timestamp identifies when the overall transaction was initiated.

21. The non-transitory computer readable storage medium of claim 20, wherein a probe carries the global timestamp and the unique transaction ID associated with a transactional request.

22. The non-transitory computer readable storage medium of claim 14, wherein the transaction memory agent negative acknowledges (NACKs) probe requests from a globally coherent shared memory controller based on time stamp and identifier (ID) comparisons, wherein the memory controller automatically retry the probe requests until they terminate with a probe completion reply.

23. The non-transitory computer readable storage medium of claim 14, the program further executable to provide or maintain a reverse address translation mechanism, wherein the reverse address translation mechanism provides a mapping between globally coherent memory controller directed probes that target physical addresses, and probes that communicate with one or more virtual addresses.

24. The non-transitory computer readable storage medium of claim 23, the program further executable to receive an error indicator indicating that the write of the one or more transaction variables failed to complete within a threshold amount of time, wherein the one or more transaction variables is not written to the globally coherent memory after receiving the error indicator.

25. The non-transitory computer readable storage medium of claim 14, the program further executable to perform at least one of retrying a failed write transaction and confirming cancellation of the failed write transaction.

26. A system comprising:
a plurality of compute nodes;
a private memory in each of the compute nodes; and
a transactional memory agent that is associated with at least one of the plurality of compute nodes, wherein a first transactional memory agent in a first compute node:
performs global memory transactions between a requesting processor at the first compute node and a globally shared memory that is a globally coherent memory,
receives a transactional read request from the requesting processor;
copies data from one or more shared memory addresses in the globally shared globally coherent memory to a private memory associated with the requesting processor,
receives a transactional write request from the requesting processor;
sends data from the private memory associated with the requesting processor for storage in the globally shared memory after receiving the transactional write request,
receives a command from the processor providing one or more transaction variables to be written to the globally shared memory, wherein the globally shared memory is a globally coherent memory; and
sends the one or more transaction variables to the globally coherent memory for storage.

* * * * *